United States Patent [19]

Tetirick

[11] 4,300,530
[45] Nov. 17, 1981

[54] SOLAR HEAT CONTROL APPARATUS FOR A BODY OF WATER

[76] Inventor: Jack E. Tetirick, 105 Indian Springs Dr., Columbus, Ohio 43214

[21] Appl. No.: 132,780

[22] Filed: Mar. 24, 1980

[51] Int. Cl.³ .............................................. F24J 3/02
[52] U.S. Cl. .................................. 126/415; 126/450; 126/439; 126/449
[58] Field of Search ............... 126/415, 416, 419, 422, 126/436, 437, 438, 439, 449, 450, 901; 4/499–503

[56] References Cited

U.S. PATENT DOCUMENTS

| | | | |
|---|---|---|---|
| 2,969,918 | 1/1961 | Phelps | 126/417 |
| 4,214,572 | 7/1980 | Gonder | 126/438 |

*Primary Examiner*—Samuel Scott
*Assistant Examiner*—G. Anderson
*Attorney, Agent, or Firm*—Robert E. Stebens

[57] ABSTRACT

A solar energy control apparatus is provided for use in conjunction with a water storage tank and performs the functions of converting solar radiation to heat energy and controlling transfer of heat relative to the water contained in the storage tank. The structure of this apparatus includes a structural frame that may be floated on the water, a plurality of metal plates carried by the frame for converting solar radiation and controlling of the heat transfer relative to the body of water and a cover of glass or plastic panels and thermally insulating-radiation reflecting walls. This cover includes a radiation transmissive panel and an opaque panel attached at one end to one another in longitudinally aligned relationship and supported on the frame in an inverted V along with closing sidewalls. The frame has projecting from it into the water below heat conductive metal plates which are coated on one side with a heat absorbing coating and on the other with a radiation reflective coating. These plates are selectively movable into and out of the water and in angled position for controlling radiation conversion and heat transfer. The inwardly facing surface of the opaque panel is coated with a radiation-reflective surface coating and is provided with thermally insulative material in its wall.

18 Claims, 5 Drawing Figures

SOLAR HEAT CONTROL APPARATUS FOR A BODY OF WATER

BACKGROUND OF THE INVENTION

This invention is directed to the providing of a solar heat apparatus which is designed for use with a water storage type system. Several types of water storage solar energy panels are known for use in conjunction with a water storage tank; however, the known type generally comprises structures which form covers for bodies of water and essentially function as a thermally insulative covering. None of the previously known structures incorporate a capacity for affecting control over the transfer of the solar energy to the water or over conversion of solar radiation to heat energy. Most of the known structures are of a type designed for either floating on the surface of water and providing heat transfer through the side walls of the structure or are of a type in which the water passes through a cavity within the structure with the solar radiation directly heating the water. Examples of the former type of structure are disclosed in the patents issued to Gerlach, U.S. Pat. No. 3,984,881; Forman, et al, U.S. Pat. No. 3,984,882; Roberts, U.S. Pat. No. 4,022,187 and Smith, U.S. Pat. No. 3,893,443. An example of the latter type of water storage tank solar energy system is shown by Voelker, U.S. Pat. No. 4,079,726.

Gerlach discloses a circular polyethylene panel which traps the heat of the sun by a thermally insulating air space formed within the body of the panel and may be of a color to enhance radiation absorption. The panel also acts to provide a covering for the body of water to prevent substantial heat loss from the pool. Forman discloses a similar circular plastic frame which possesses a channel running through the interior of the frame. Plastic sheets are fastened to the upper and lower edges of the frame, thus creating an enclosed cavity. The sheet itself has air filled interstices distributed about it due to its woven construction. Roberts also discloses a solar heating apparatus which is used as a pool cover in which a plurality of geometrically shaped units which may be attached to one another in a geometric pattern to form a large area cover. Each unit includes an upper and lower panel of plastic material, the upper one being transmissive of solar radiation and the lower being opaque. These plastic panels are joined at their peripheries to provide a thermal compartment between the opposing panel surfaces. Smith also discloses a floating solar heater in which the walls form a shallow chamber of substantially dead air space. All of the above patents feature enclosed panel structures featuring an upper and lower plastic sheet layer. Additionally, each of the patents rely on the transmission of heat from the enclosed air space to the body of water through the exchange of heat from the lower panel of the solar heating apparatus and furthermore, none of these structures have any means of affecting control over the conversion of solar radiation to heat energy or subsequent transfer of heat energy to or from the body of water that acts as a storage tank.

The other type of system which has utilized a water storage system is disclosed in Voelker. This system comprises a solar collector whereby the water of the pool is heated by circulation through the collector. This collector comprises a solar cover having upper and lower sheet surfaces forming channels through which the water is circulated.

The known structures for this purpose as illustrated in these patents are somewhat inefficient in preventing the loss of heat energy from the body of water back into the atmosphere due to their geometric configuration. They also provide for extremely slow heating of the water since they either depend on the direct conversion of solar radiation in the water or transfer of heat through a plastic sheet that has a low heat transfer characteristic or depend upon the circulation of the water between the two sheets of plastic as in Voelker. Additionally, the known structures do not have any means for controlling the amount of energy transferred to the water. Therefore, while the above noted structures are capable of providing a storage system for solar energy, they do not accomplish this objective in an efficient and selectively controllable manner.

SUMMARY OF THE INVENTION

In accordance with this invention, a device for heating a body of water through the application of solar energy is provided for advantageous use in conjunction with a water storage unit when installed in association therewith in a suitable medium such as a swimming pool. The structure of the invention can be generally summarized as comprising a cover adapted to float on the water and carrying a plurality of solar radiation absorbing and heat transfer plates that can be selectively projected into the water. The cover is of an inverted triangular configuration designed to enhance entrapment of the solar energy. The heat transfer plates are selectively positionable in angular relationship to the incident solar radiation to increase or decrease their relative effectivity. Opposite surfaces of the transfer plates are provided with solar radiation reflective and radiation absorption coatings.

The glass or plastic panels which comprise a cover structure for the invention are of a double panel design to aid in thermal insulation while transmitting thermal radiation. There are opaque panels which complete the structure to form the cover. These transparent and opaque panels are attached to one another and to a floating frame to which the heat conductive metal plates are attached. The solar radiation transparent glass panel is approximately half the width of the opaque panel with the two panels joined at a right angle, therefore, the angle of inclination of the transparent panel is approximately 60 degrees for optimization of radiation transmission. Opaque sidewall panels are also provided to complete the housing or cover. In accordance with this invention, the inwardly facing surfaces of the opaque panels have a highly reflective surface coating applied thereto to further aid in the trapping of the solar energy. By turning the heat conductive metal plates to a relatively horizontal position, it is possible to provide an additional heat saving cover to the body of water during such times as solar radiation is not available. Alternatively, the plates can be turned so that radiation will be reflected upwardly and thus substantially inhibit any further absorption of heat.

Included in the apparatus are the double glass panels, the floating frame, the heat conductive metal plates and the pivoting mechanism for the metal plates. The sides of the apparatus having a covering to further aid in the retention of heat beneath the apparatus. The apparatus units embodying this invention are preferably formed in relative small modular units to facilitate handling and each such unit may be approximately ten inches in height above the water and have a width of approximately two feet. The length of the apparatus units is of the order of 2½ feet. A plurality of these units are assembled in a group such that they will extend completely across the surface of the pool of water.

Solar radiation passes through the transparent glass panels and, once trapped beneath the cover, is selectively and controllably transferred to the water below by the absorption and transfer of heat through the metal plates. Solar radiation which passes through the transparent panels is also reflected from the surface of the opaque panels into the water in which the metal plates are positioned. The amount of energy stored in such a system can, therefore, be controlled through the pivoting of the plates to a particular selected position to either absorb or reflect solar radiation. Also, since the plates are of a heat conductive metal, the solar radiation absorbed and converted to heat energy in the plates can be transferred to the water at a far greater rate than is possible by direct absorption in the water as in the case of other known structures.

A primary objective of this invention is to provide a suitable device for heating a body of water using solar radiation that is transferred from the air to the water by means of a solar energy collector. The collector is of extremely economical and rugged construction and is capable of particularly easy installation. Furthermore, the collector is easy to operate and readily adapted to automatic operation and is extremely efficient in capturing solar radiation and transferring the radiation thus converted to heat energy to a storage tank.

Another objective of this invention is to provide a device to aid in the heating of a body of water through the utilization of solar radiation which is selectively controllable as to the conversion of radiation to heat energy on transfer of heat energy to the body of water.

Still another important objective is to provide a solar energy device for heating a body of water which stores the solar energy and minimizes the loss of the heat energy from the body of water to the surrounding atmosphere.

These and other objectives and advantages of this invention will be readily apparent from the following detailed description of an illustrative embodiment thereof. Reference will be had to the accompanying drawings which illustrate the embodiment of the invention.

DESCRIPTION OF THE DRAWING FIGURES

DESCRIPTION OF THE ILLUSTRATIVE EMBODIMENT

Figure 1:
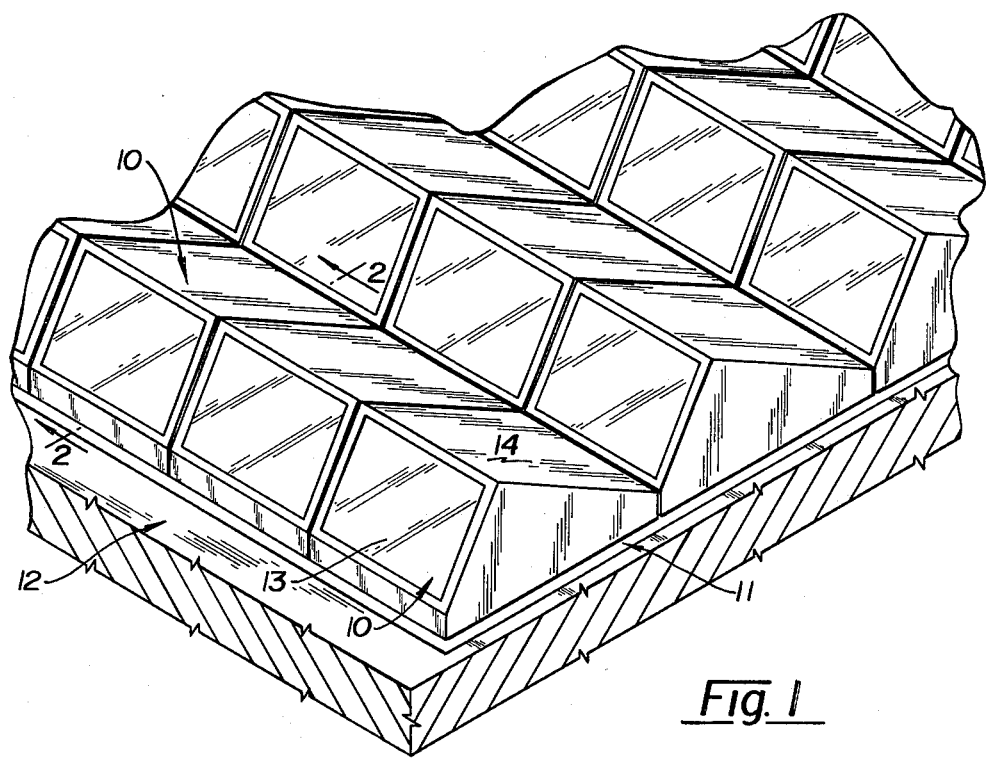
FIG. 1 is a perspective view of a fragmentary portion of a water storage tank provided with a solar heat control apparatus embodying this invention.
Figure 3:
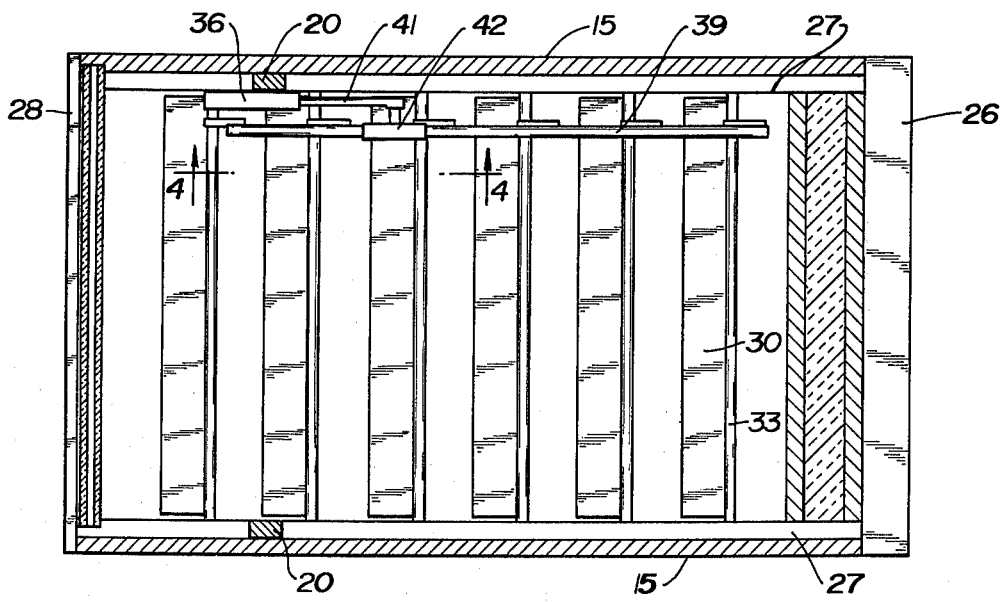
FIG. 3 is a horizontal sectional view taken along line 3—3 of FIG. 2.

Having reference to the several figures of the drawings, attention is first directed to FIG. 1 which shows a number of the modular units or devices embodying this invention for heating of a body of water by solar radiation and affecting storage of solar energy in the form of heat energy. The several modular units or devices designated generally by the numeral 10 are installed in operative relationship to a body of water 11 contained in an open top water storage structure 12 which may conveniently comprise a swimming pool. In the illustrative embodiment, several of the modular units are positioned on the surface of the body of water 11 in closely disposed, adjacent relationship and, when thus disposed in contiguous relationship, these several units preferably overlie substantially the entire surface area of the pool. Although complete water surface coverage is illustrated in FIG. 1, and is desired for greatest efficiency, it will be recognized that less than total surface coverage may be sufficient to achieve intended objectives in some instances of utilization. As will be noted hereinafter in greater detail, the solar units 10 are of a predetermined physical size so as to facilitate handling and thus an assembled group of such uniformly sized units may not exactly cover the surface of an existing swimming pool. As indicated, exposed water surface of limited area may not be significant but, if it is, either modified modular units may be constructed or other means provided to provide complete surface coverage for thermal efficiency.

The structure of the swimming pool 12 is of a conventional nature and is not otherwise described or illustrated as such construction specifics do not form a part of this invention. The pool is only shown to illustrate the application of the solar energy storage apparatus of this invention in combination with a water storage tank of conventional construction. However, the pool 12, or other water storage structure, would be provided with means to extract or utilize the stored heat energy; as for example, by water circulating means associated with a heat exchanger incorporated in a utilization apparatus, all of which are well known to those skilled in the art and, therefore, are not shown or described in further detail.

The solar energy storage units of this invention, and which units are shown in greater detail in FIGS. 2, 3, 4 and 5, include, as basic components thereof, two primary panels 13 and 14 in combination with opposed sidewall panels 15 and which form a solar collector cover 16 that defines an enclosed space. This cover 16 is mounted on a supporting frame 17 that, in the illustrative embodiment, is designed to float on the body of water 11 and also carries the solar radiation absorption and heat transfer means indicated generally by the numeral 18. One panel 13 is designed to be transmissive of solar radiation and may be constructed of glass plates, but it may be fabricated of plastic materials having equally suitable solar radiation transmitting characteristics. The other panel 14 is constructed to be thermally insulative and non-transmissive of solar radiation as are the side panels 15. The two primary panels 13 and 14 are disposed in end-joined relationship at a transverse juncture which defines an uppermost peak 19 as these two panels are also disposed in upwardly and relatively inwardly inclined relationship thus defining an inverted V. A support post 20 is provided at each longitudinal side and extends upwardly from a respective side member of the frame 17 into supporting engagement with the panels 13 and 14 to enhance the structural rigidity of the unit.

Figure 2:
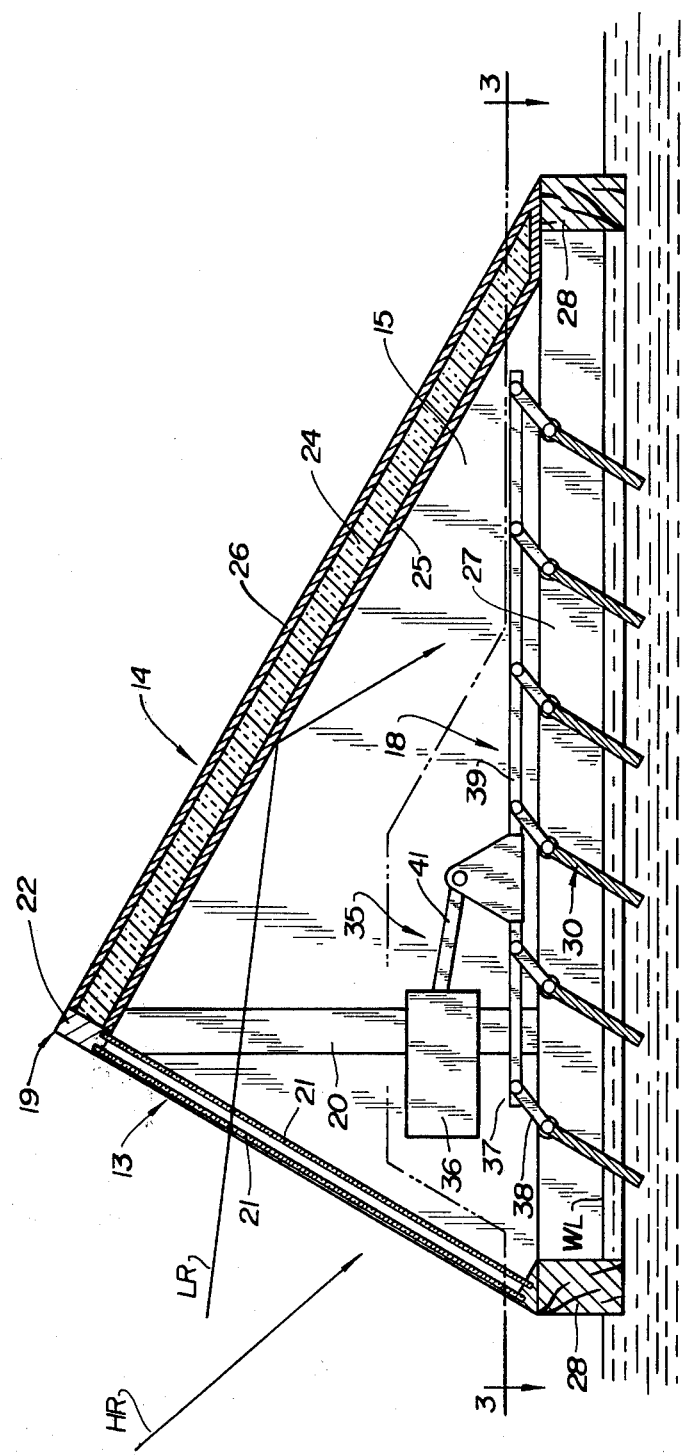
FIG. 2 is a vertical sectional view on an enlarged scale taken along line 2—2 of FIG. 1.

The panel 13 which is designed to be transmissive of solar radiation is also preferably designed to be thermally insulating. To achieve this objective, this panel is constructed with two glass plates or panels 21 disposed in spaced coplanar relationship thus forming a dead air space that is highly effective as a thermal insulator in inhibiting transmission of radiant heat energy and effectively prevents conduction of heat. As previously indicated, this panel may also be fabricated from other materials, such as plastic materials, that exhibit equal or better characteristics with respect to transmission of solar radiation and to heat transmission. This structural relationship of the two glass panels 21 is obtained by the upper and lower transverse headers 22 and 23, as seen in FIG. 2, and the vertically extending support posts 20. The lower header 23 is mounted on an end member of the frame 17 while the upper header 22 is secured to the upper ends of the posts 20.

Construction of the other primary panel 14, which is non-transmissive of solar radiation and is thermally insulating, includes sandwiching of a thermally insulating sheet 24 between a pair of thin sheets 25 and 26 that are bonded to the insulating sheet to form a structurally rigid panel. A lower end of this panel is secured to an end member of the frame 17 while its upper end is secured to the upper transverse header 22. Preferably, the exposed surface of the inner sheet 25 is coated with a layer of material that enhances its ability to reflect solar radiation.

Each of the sidewall panels 15 is of a construction similar to the primary panel 14 and are designed to also be inwardly reflective of solar radiation and preventing conduction of heat energy therethrough. These sidewall panels 15 are of a triangular configuration to complement the primary panels 13 and 14 with a lower edge sealed against a side member of the frame 17 and the other two edges sealed with respective edges of the primary panels.

In the illustrative embodiment, the supporting frame 17 is designed to float on the water in supporting the collector cover 16 and the solar radiation absorption and transfer means 18. For this purpose, the frame is fabricated from structural wood members including opposed side members 27 and opposed end members 28 that are secured into a rigid, rectangularly shape frame. These members are selected to be of a dimension such that adequate bouyancy is provided to maintain the cover 16 out of the water. Wood was selected for purposes of illustration as a floatation element but it will be understood that other types of floatation elements and devices may be utilized. For example, metalic or plastic structural tubes may be utilized, either with or without internally contained positive floatation material.

Carried on the frame 17 is the solar radiation absorption and transfer means 18 which comprises a plurality of flat plates 30 that are disposed in spaced parallel relationship and extend transversely across the frame. Each of the plates (see FIGS. 4 and 5) is fabricated from a material that has a relatively high coefficient of heat conduction and are preferably coated on one surface with a layer 31 of material that enhances absorption of solar radiation. The opposite surface of each plate is preferably coated with a layer 32 of a material that is reflective of solar radiation.

Figure 4:
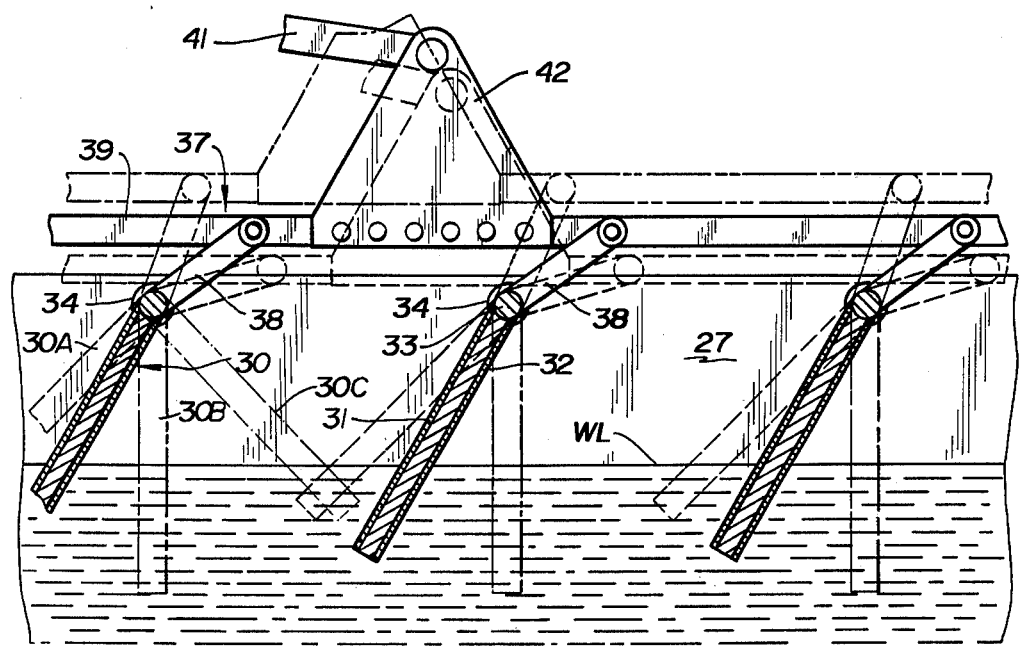
FIG. 4 is a fragmentary vertical sectional view on a further enlarged scale taken along line 4—4 of FIG. 3.

In accordance with this invention, the plates 30 are supported on the frame 17 for pivoting about a horizontal axis extending transversely of the frame thereby permitting selective angular displacement to a preferred position as to the angle of incidence of solar radiation to the surface of plates and the extent to which the plates are immersed in the water. This is accomplished by securing a shaft 33 on one longitudinal edge of each respective plate and journalling an extension of that shaft at opposite end of the plate in respective bearings 34. These bearings 34 are mounted on the frame side members 27 at a position to be a predetermined distance above the waterline WL. With the plates 30 being of a predetermined width, they will then extend a predetermined distance into the water when revolved to a substantially vertically disposed position as shown in FIG. 4. In the illustrative embodiment, it will be seen that the plates have nearly equal longitudinally extending marginal edge portions that are below and above the water line WL. This nearly equal ratio for a specific structure may be adjusted in either direction as may be dictated by particular factors such as the heat conductivity of the material from which the plates are formed and their ability to absorb and convert incident solar radiation to heat energy in conjunction with their ability to transfer that heat energy to the water. It will also be noted that while the plate support shafts 33 are shown as extending the full length of the plates thereby enhancing the structural strength of plates, these shafts may comprise relatively short sections where the plates are fabricated to have sufficient strength so as to be self-supporting when thus suspended across the frame.

Pivoting of the plates 30 to a selected angular position provides the basis for effecting control over the apparatus' ability to effect conversion of solar radiation to heat energy. Solar radiation will be received by the apparatus at any number of angles of incidence as diagrammatically indicated in FIG. 2 where an apparatus unit 10 is oriented in the preferred manner with the radiation transmitting panel 13 facing in a generally southerly direction. The plates are positioned with this orientation of the unit to have the surfaces thereof coated with the radiation absorptive coating 31 facing in the direction of the radiation. With the unit thus oriented, this panel would be more nearly perpendicular to the path of the radiation during the mid-portion of the day. This radiation thus enters the cover 16 through the panel 13 and may then be incident to the surface of the plates whether above or immersed in the water. Absorption of solar radiation by the plates may be optimized by positioning those plates to be perpendicular to the incident radiation. Pivoting the plates to a position where they are not perpendicular will decrease the amount of radiation that can be absorbed as some of the incident radiation will be then reflected with the amount that is reflected proportionally dependent on the angle of incidence. Thus control can be effected over the absorption of radiation by pivoting the plates in accordance with the incident radiation whicy may vary between the relatively high angle radiation HR or relatively low angle radiation LR as determined by the geographical latitude and season of the year.

This pivoting of the plates 30 to a position for optimumization of radiation absorption is diagrammatically illustrated in FIG. 4. With high angle radiation HR, the plates are preferably pivoted to the broken line position 30A, whereas, for the low angle radiation LR, they would be pivoted to the broken line position 30B. For other intermediate angles of incidence, the plates would be pivoted to a corresponding angle intermediate the illustrated positions 30A and 30B.

Alternatively to pivoting of the plates to an optimum angle for absorption of solar radiation, these plates may be pivoted to a position so as to obtain a particular ratio of the marginal edge portion that are immersed in the water and those that are exposed to incidental solar radiation. This difference in ratios that may be obtained can be seen in FIG. 4 through comparison of the alternate positions and noting that with further rotation of the plates in a counterclockwise direction, such as to the broken line position 30C, the extent of plate immersion can be decreased to any desired degree. The effect of changing the ratio as to immersed edge portion will be in conjunction with the effect of changing the plates angle to the incident solar radiation and an optimum plate position can be determined for any particular operating condition.

It was previously noted that the plates 30 were mounted with their axes of rotation disposed a predetermined distance above the water level WL to obtain a particular ratio of the immersed and exposed edge portions for any specific angular position. Clearly, repositioning of the plates axes of rotation will result in obtaining of other ratios and, if desired, provision may be made to permit selective repositioning. For example, the plates 30 may be mounted on a sub-frame (not shown) that can be selectively raised or lowered to the floating supporting frame 17. Also, the supporting frame need not be a floating frame but could be mounted on the walls of the water storage structure and provided with selectively operable elevating means to obtain a change with respect to the water level. Alternatively, the supporting frame could be mounted in a fixed position and means provided to change the water level. However, while these alternative expedients could be utilized to obtain further control over the effectivity of the plates in converting solar energy and transferring heat energy to the body of water, the floating frame and pivoting-only structure such as that which is illustrated is considered to be the most practical embodiment with respect to both efficiency and economic considerations.

Figure 5:
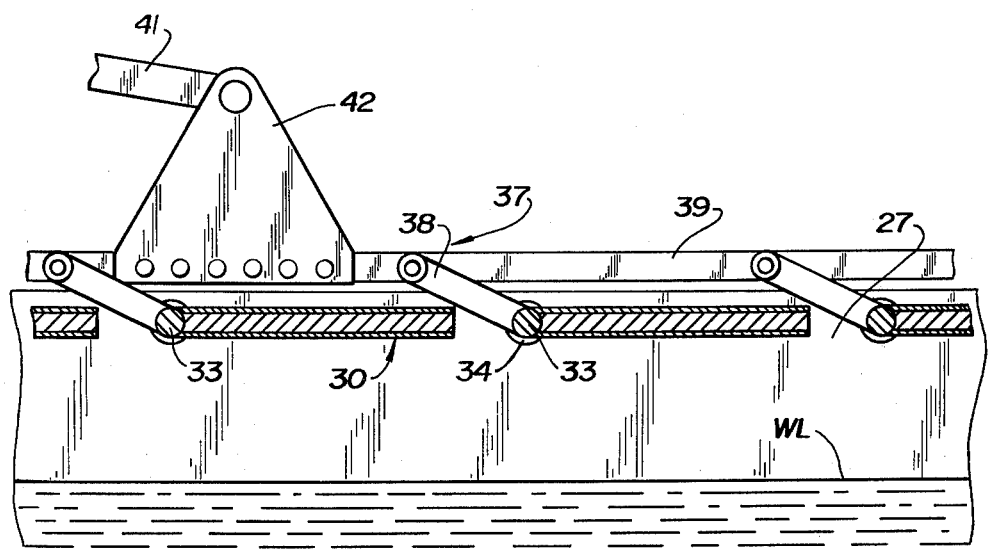
FIG. 5 is a vertical sectional view similar to FIG. 4 but showing the heat control plates pivoted to a heat insulating position.

Referring to FIG. 5, it will be seen that the plates 30 in the illustrative embodiment may be pivoted to a substantially horizontal position and completely withdrawn from the water. The plates are of a width that is substantially equal to the lateral spacing of their supporting pivot axes and when thus horizontally positioned, will form an effective barrier to the solar radiation entering the cover 16 and prevent such radiation from being converted into heat energy that can be directly transferred to the water. In this horizontal position, the plates are positioned with surfaces coated with the radiation reflective layer 32 facing upwardly and solar radiation incident thereto will tend to be reflected and initially directed toward the inner reflective sheet 25 of the non-transmissive primary panel 14. Through subsequent reflection from sheet 25 and the plates 30, the solar radiation will generally be redirected outwardly of the cover through the radiation transmissive panel 13.

Rotational displacement of all plates 30 to a selected angular position is concurrently accomplished by a mechanized pivoting apparatus 35 in this illustrative embodiment. This apparatus includes an actuating mechanism 36 and a mechanical linkage 37. Forming the mechanical linkage are lever arms 38 and an actuating bar 39 which is pivotally connected to one end of each lever arm. The opposite end of each lever arm 38 is secured to a respective plate support shaft 35 in fixed relationship whereby longitudinal displacement of the bar 39 will produce concurrent angular displacement of the plates 30. In this respect, it will be noted that the lever arms 38 are disposed in angled relationship to the plates 30 in the form of a bell crank so that the actuating bar 39 may extend substantially horizontally but will be capable of effecting the complete angular displacement of the plates between the horizontal position shown in FIG. 5 and at least the angular position 30A in FIG. 4.

The actuating mechanism 36 includes a power drive unit 40 having a relatively reciprocable connector bar 41 projecting therefrom. The one end of the connector bar is pivotally secured to a connecting bracket 42 which is fastened to the actuating bar 39. Operation of the power drive unit 40 to cause extension or retraction of the connector bar 41 will thus effect angular displacement of the plates 30. Specifics of the power drive unit 40 are not illustrated or described since appropriate structures are commercially available. The unit may be of a direct manual control type or automated controls may be provided to respond to various parameters such as water temperature, and the angle of incidence of the solar radiation, or to the absence of solar radiation.

To provide a better reference for structural configuration of a modular unit, suggested dimensions are a unit that in plan view has a longitudinal dimension of about two and one-half feet while having a width of about two feet. The radiation transmissive panel 13 has a vertical extent of one foot and is disposed at an angle of about 60 degrees with respect to a horizontal plane while the other primary panel 14 is about two feet in a longitudinal direction and is disposed at an angle of about 30 degrees with respect to a horizontal plane. Each of the plates 30 is about three inches wide and they have their axes spaced apart about the same distance. Modular units of these dimensions can be handled relatively easily. The 60 angle of the radiation transmissive panel 13 is selected as providing the optimum orientation to the average angle of incidence of the solar radiation.

Having thus described the solar energy units 10 construction and specific operational features of the structural components, the utilization thereof and advantages are clearly demonstrated. Each unit provides a substantially improved and efficient operation in affecting the controllable conversion of solar radiation to heat energy and the transfer of that heat energy to the body of water performing the ultimate heat storage function. Utilization of the plurality of heat conductive plates 30 significantly enhances the efficiency of operation in that the plates are much more effective in converting solar radiation to heat energy than is the direct incidence of solar radiation with the water. Controlling of the angular position of the plates with respect to the direction of incident solar radiation further enhances effectiveness of the apparatus and, in the case of low angle solar radiation (LR), a portion of such radiation passing through the radiation transmissive panel 13 will be incident to the inner reflective sheet 25 and will be generally reflected downwardly toward the plates, and water, where it will be subjected to absorption and conversion to heat energy. The modular units 10, because of the thermally insulative construction of the cover 16, will effectively retain the heat energy that is converted and prevent its reradiation to the atmosphere. For this reason, complete covering of the body of water 11 with the modular units, or in conjunction with other thermally elements, will enhance efficiency and effectiveness of the apparatus. Excellent efficiency in conversion of solar energy to more readily usable heat energy and controllability over that conversion are important attributes of this invention.

Having thus described this invention, what is claimed is:

1. A solar heat control apparatus for a body of water comprising
a structural frame adapted to be supported at an upper surface region of a water body, and
solar radiation conversion and heat transfer control means carried by said frame, said control means including at least one heat conductive plate having first and second surfaces on opposite sides thereof and mounted on said frame for selective movement of said plate relative to the upper surface of a water body, said plate having a first marginal edge immersible in the water body and a second marginal edge portion projecting above the water body to thereby affect control of solar radiation effectively incident to the first surface of said plate and converted to heat energy and to control transfer of heat energy relative to the water body in accordance with the relative position of said plate to the upper surface of the water body.

2. A solar heat control apparatus for a body of water comprising
a structural frame adapted to be supported at an upper surface region of a water body, and
solar radiation conversion and heat transfer control means carried by said frame, said control means including at least one heat conductive plate having first and second surfaces on opposite sides thereof and mounted on said frame for selective movement of said plate relative to the upper surface of a water body, said plate having a first marginal edge portion immersible in the water body and a second marginal edge portion projecting above the water body to thereby affect control of solar radiation effectively incident to the first surface of said plate and converted to heat energy and to control transfer of heat energy relative to the water body in accordance with the relative position of said plate to the upper surface of the water body, wherein said plate is selectively movable to increase or decrease the extent to which the first marginal edge portion thereof is immersed in the water body.

3. A solar heat control apparatus for a body of water comprising
a structural frame adapted to be supported at an upper surface region of a water body, and
solar radiation conversion and heat transfer control means carried by said frame, said control means including at least one heat conductive plate having first and second surfaces on opposite sides thereof and mounted on said frame for selective movement of said plate relative to the upper surface of a water body, said plate having a first marginal edge portion immersible in the water body and a second marginal edge portion projecting above the water body to thereby affect control of solar radiation effectively incident to the first surface of said plate and converted to heat energy and to control transfer of heat energy relative to the water body in accordance with the relative position of said plate to the upper surface of the water body, wherein said heat conductive plate is selectively movable to a predetermined angular position relative to a horizontal plane whereby control is affected over the angle of incidence of solar radiation to at least the first surface of said plate.

4. A solar heat control apparatus according to claims 2 or 3 wherein said heat conductive plate is mounted for swinging movement about a horizon axis.

5. A solar heat control apparatus according to claim 4 wherein said heat conductive plate is pivotable to a position where said first marginal edge portion is not immersed in a water body.

6. A solar heat control apparatus for a body of water comprising
a structural frame adapted to be supported at an upper surface region of a water body, and
solar radiation conversion and heat transfer control means carried by said frame, said control means including at least one heat conductive plate having first and second surfaces on opposite sides thereof and mounted on said frame for selective movement of said plate relative to the upper surface of a water body said plate having a first marginal edge portion immersible in the water body and a second marginal edge portion projecting above the water body to thereby affect control of solar radiation effectively incident to the first surface of said plate and converted to heat energy and to control transfer of heat energy relative to the water body body in accordance with the relative position of said plate to the upper surface of the water body, wherein said heat conductive plate is mounted for swinging movement about a horizontal axis between a position having the first marginal edge portion immersed in a water body and a position wherein said plate is disposed in a substantially horizontal plane.

7. A solar heat control apparatus according to claim 6 wherein said heat conductive plate has its second surface facing upwardly when the plate is disposed in said substantially horizontal plane and said second surface is coated with a solar radiation reflecting material.

8. A solar heat control apparatus for a body of water comprising
a structural frame adapted to be supported at an upper surface region of a water body, and
solar radiation conversion and heat transfer control means carried by said frame, said control means including at least one heat conductive plate having first and second surfaces on opposite sides thereof and mounted on said frame for selective movement of said plate relative to the upper surface of a water body said plate having a first marginal edge portion immersible in the water body and a second marginal edge portion projecting above the water body to thereby affect control of solar radiation effectively incident to the first surface of said plate and converted to heat energy to control transfer of heat energy relative to the water body in accordance with the relative position of said plate to the upper surface of the water body, wherein one of said first and second surfaces of said heat conductive plate is coated with a material enhancing absorption of solar radiation.

9. A solar heat control apparatus for a body of water comprising
a structural frame adapted to be supported at an upper surface region of a water body, and
solar radiation conversion and heat transfer control means carried by said frame, said control means including at least one heat conductive plate having first and second surfaces on opposite sides thereof and mounted on said frame for selective movement of said plate relative to the upper surface of a water body said plate having a first marginal edge portion immersible in the water body and a second marginal edge portion projecting above the water body to thereby affect control of solar radiation effectively incident to the first surface of said plate and converted to heat energy and to control transfer of heat energy relative to the water body in accordance with the relative position of said plate to the upper surface of the water body, wherein said control means includes a plurality of said heat conductive plates disposed in relatively spaced relationship, each of said plates being mounted on said frame for such selective movement.

10. A solar heat control apparatus according to claim 9 wherein each of said plates is mounted for swinging movement about a horizontal axis between a position having the first marginal edge portions immersed in a water body and a position wherein said plates are disposed in a substantially horizontal plane.

11. A solar heat control apparatus according to claim 10 which includes a plate pivoting means, said plate pivoting means mechanically coupled with each of said plates and selectively operable to simultaneously pivot each of said plates to a same predetermined angular position about their respective horizontal axes.

12. A solar heat control apparatus according to claim 11 wherein said plate pivoting means includes a mechanical linkage interconnecting with each of said plates and actuating means coupled with said linkage, said actuating means responsive to a control parameter and including means for sensing of the parameter.

13. A solar heat control apparatus according to claim 9 which includes a cover mounted on said structural frame in superposed relationship to said heat conductive plates, said cover being thermally insulative to minimize a transfer of heat energy to the atmosphere.

14. A solar heat control apparatus according to claim 13 wherein said structural frame has a predetermined width dimension with said heat conductive plates extending across the width of said frame, said cover having a solar radiation transmitting panel extending across the width of said frame adjacent one end thereof in upwardly and inwardly inclined relationship thereto.

15. A solar heat control apparatus according to claim 14 wherein said cover includes a top thermally insulative panel extending from said solar radiation transmitting panel to the opposite end of said frame and respective longitudinally extending, thermally insulative side panels which cooperate with said solar radiation transmitting panel and said top thermally insulative panel to form a closed chamber on said frame.

16. A solar heat control apparatus according to claim 15 wherein said top thermally insulative panel is disposed in downwardly inclined relationship from the top of said solar radiation transmitting panel and has the interiorally facing surface thereof coated with a material that has a relative high coefficient of reflection for solar radiation.

17. A solar heat control apparatus according to claim 15 wherein said solar radiation transmitting panel is inclined at about 60 degrees with respect to a horizontal plane and said top thermally insulative panel is inclined at about 30 degrees with respect to a horizontal plane.

18. A solar heat control apparatus according to claim 9 wherein said structural frame is adapted to float on a water body.

* * * * *